US010421195B2

(12) United States Patent
Zimmer et al.

(10) Patent No.: US 10,421,195 B2
(45) Date of Patent: Sep. 24, 2019

(54) PRECISION GRIPPING DEVICE

(71) Applicants: Martin Zimmer, Rheinau (DE); Guenther Zimmer, Rheinau (DE)

(72) Inventors: Martin Zimmer, Rheinau (DE); Guenther Zimmer, Rheinau (DE)

( * ) Notice: Subject to any disclaimer, the term of this patent is extended or adjusted under 35 U.S.C. 154(b) by 0 days.

(21) Appl. No.: 15/729,783

(22) Filed: Oct. 11, 2017

(65) Prior Publication Data
US 2018/0085929 A1    Mar. 29, 2018

Related U.S. Application Data

(63) Continuation-in-part of application No. PCT/DE2016/000148, filed on Apr. 10, 2016.

(30) Foreign Application Priority Data

Apr. 11, 2015 (DE) .................. 10 2015 004 404

(51) Int. Cl.
B25J 15/00 (2006.01)
B25J 15/02 (2006.01)
F16C 29/12 (2006.01)

(52) U.S. Cl.
CPC ....... B25J 15/0028 (2013.01); B25J 15/0253 (2013.01); F16C 29/126 (2013.01)

(58) Field of Classification Search
CPC ............... B25J 15/0028; B25J 15/0253; B25J 15/0273; F16C 29/126
USPC .............................................. 294/119.1, 207
See application file for complete search history.

(56) References Cited

U.S. PATENT DOCUMENTS

| 2,654,640 | A | * | 10/1953 | Bullard | B23Q 1/26 384/39 |
| 4,482,289 | A | * | 11/1984 | Inaba | B25J 15/0052 294/81.2 |
| 5,529,359 | A | * | 6/1996 | Borcea | B25J 15/0253 294/119.1 |
| 5,540,542 | A | * | 7/1996 | Krajec | G11B 5/54 294/103.1 |
| 5,890,720 | A | * | 4/1999 | Antoni | B23B 31/16233 279/110 |
| 5,947,539 | A | * | 9/1999 | Long | B25J 15/0028 294/119.1 |
| 5,967,581 | A | * | 10/1999 | Bertini | B25J 15/028 294/119.1 |
| 2003/0030294 | A1 | * | 2/2003 | Michler | B23B 31/16237 294/207 |

(Continued)

FOREIGN PATENT DOCUMENTS

| DE | 3438059 A1 * | 4/1986 | ............ B23Q 1/262 |
| DE | 19931133 A1 * | 1/2001 | ............ F16C 29/004 |

(Continued)

Primary Examiner — Gabriela M Puig
(74) Attorney, Agent, or Firm — Klaus J. Bach

(57) ABSTRACT

In a gripping device with carriages movably guided in a common guide groove arranged in a base body so as to be movable in a direction parallel to a gripping direction and supported all around in a direction transverse to the gripping direction, the guide groove includes at least one carriage guide track is supported therein and has opposite surfaces which are in contact with a carriage along a contact junction which is inclined with respect to the vertical longitudinal center plane at an angle of 0.3 to 1.3 degrees.

8 Claims, 4 Drawing Sheets

(56) References Cited

U.S. PATENT DOCUMENTS

2003/0189349 A1* 10/2003 Risle .................... B25J 15/0253
                                                                                                   294/207
2010/0052348 A1* 3/2010 Williams ............... B25J 15/028
                                                                                                  294/119.1

FOREIGN PATENT DOCUMENTS

| DE | 201 05 449 U1 | 9/2001 | |
|---|---|---|---|
| DE | 103 44 255 A1 | 4/2005 | |
| DE | 10344255 A1 * | 4/2005 | ............ B25J 15/028 |
| DE | 202012003942 U1 * | 5/2012 | ............... F16C 29/02 |
| DE | 102013019035 A1 * | 5/2015 | .......... B25J 15/0253 |

* cited by examiner

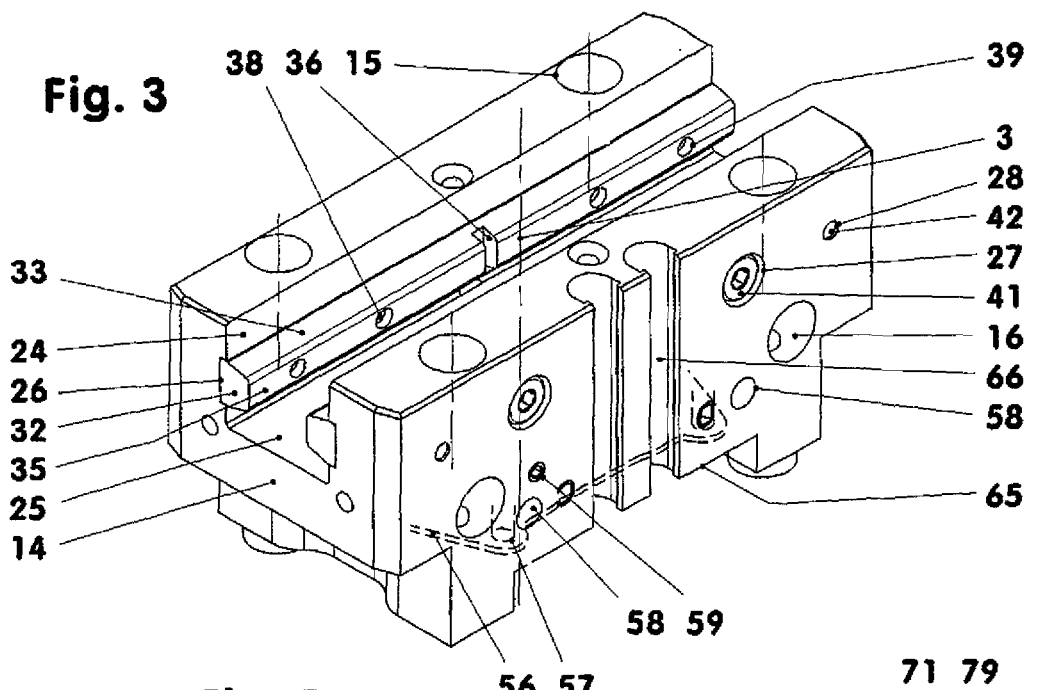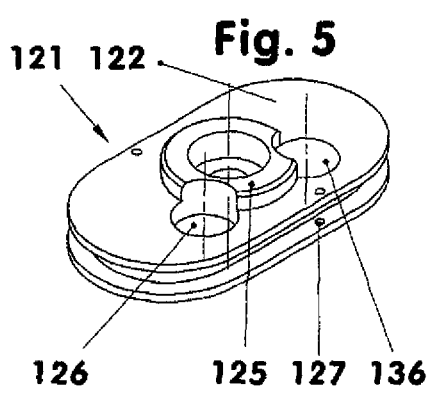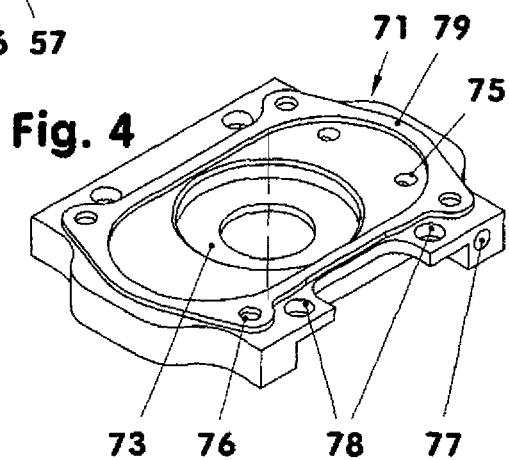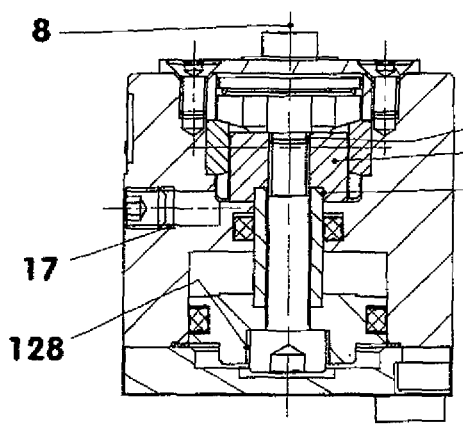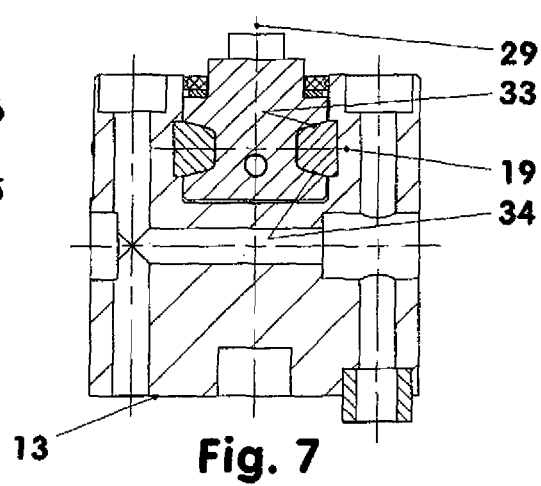

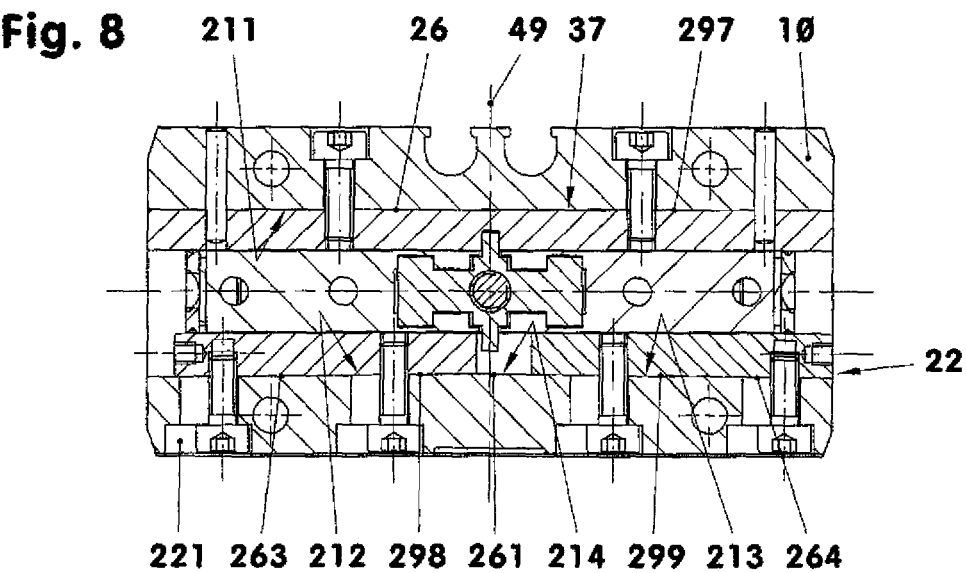
Fig. 8
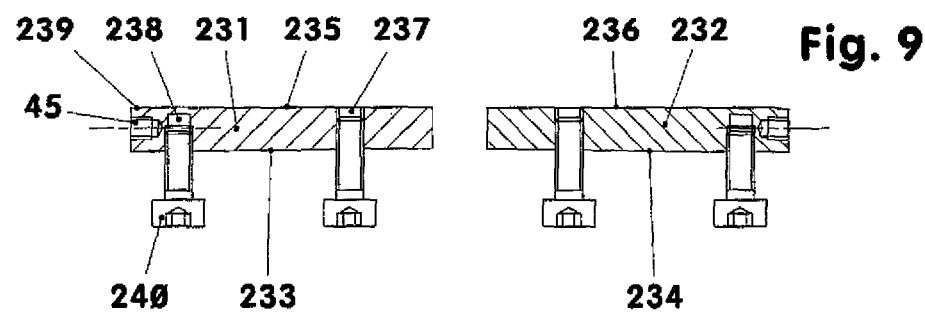
Fig. 9
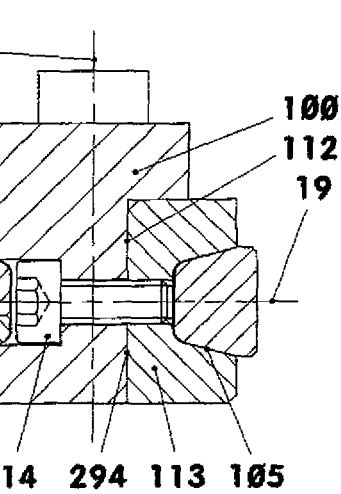
Fig. 10
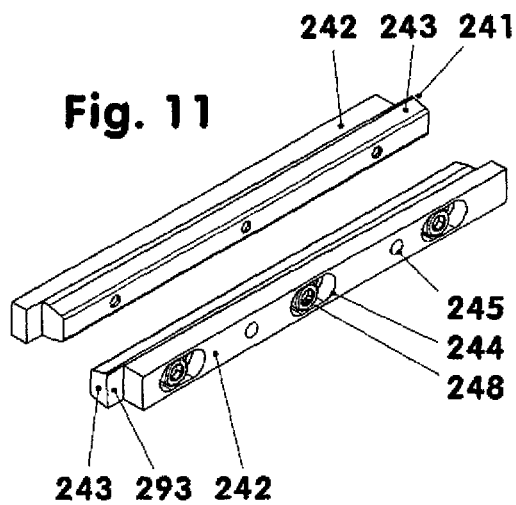
Fig. 11
Fig. 12

PRECISION GRIPPING DEVICE

This is a continuation-in-part patent application of pending international patent application PCT/DE2016/000148 filed 2016 Apr. 10 and claiming the priority of German patent application 10 2015 004 404.4 filed 2015 Apr. 11.

BACKGROUND OF THE INVENTION

The invention concerns a gripping device with carriages provided with movable gripping elements wherein the carriages are guided in a common guide groove formed in a base body and arranged one after the other in the grasping direction of the gripping elements. The gripping elements extend parallel to the gripping direction and are mechanically movable between an open and a closed position and are supported all around in a direction transverse to the gripping direction.

Such a parallel gripping device is disclosed for example in DE 103 44 255 A1. Herein, however the carriages are supported directly by the base body.

DE 201 05 449 U1 discloses a fluid-operated gripping device wherein, between a guide groove formed in a housing in which the carriages which support the gripping elements are supported, and the carriages, cylindrical guide pins are loosely disposed. The guide pins are each partially surrounded by the carriages and the guide groove.

It is the object of the present invention to provide a gripping device which can generate a large clamping force but requires only a small space and has only a relatively small mass. Furthermore, the guide system should have a high loading capacity, it should be very accurate and it should be wear-resistant.

SUMMARY OF THE INVENTION

In one respect, the invention resides in a gripping device with carriages provided with gripping elements which are movably supported in an open guide groove formed in a base body. The open guide groove has two opposite guide groove walls which are oriented mirror-reversed with respect to a longitudinal vertical guide groove center plane. In each guide groove wall, a track guide groove is arranged and in each track guide groove at least one carriage guide track is mounted. At least one track guide groove and at least one carriage guide track supported therein has for each carriage or carriage pair a surface area which surface areas are in contact with each other and which are inclined with regard to the carriage movement direction at an angle of 0.3 to 1.3 degrees. The area of the cross-section of the carriage guide track which projects from the track guide groove has a trapezoidal shape.

In another respect, the invention resides in a method for increasing the guide accuracy of the carriage supporting the movable gripping elements. Here, in connection with track guide grooves or guide groove sections and carriage guide tracks or partial guide tracks with contact grooves which are inclined with respect to the longitudinal vertical center plane, the guide play of the carriages is adjustable by a displacement of the carriage guide tracks or guide track parts by ±1 to 3 mm in the direction of the movement of the carriages. Alternatively, in connection with track guide grooves, which extend parallel to the vertical longitudinal center plane, first the distance of the groove bottoms of the oppositely arranged track guide grooves is measured, second, the depth of the carriage guide grooves of the carriages is measured and third, the contour of the carriage guide groove tracks as defined by the support flanks and the bottom surface is determined. Fourth the components mentioned under first, second and third are combined based on their geometric measurement values with a predeterminable guide play to form a carriage guide structure.

Particularly small gripping devices are required for the gripping of workpieces with gripper jaws which are very long in relation to the moving carriages which carry the gripper jaws. Because of the short guide length of the carriages in the housing of the gripping device the gripping forces are unnecessarily limited and there is a relatively high wear of the guide structure and a relatively large guide play. With the present invention, separate guide tracks for the support and guidance of the carriages, and/or gripper jaws can be installed in the device housing or, respectively, the base body based on individual component size determination and geometric dimensions of selected components whereby the guide play can be adjusted with an accuracy of a few micrometers.

Alternatively, for the guide play adjustment various design components are combined in pairs according to the slide wedge principle so as to achieve, by relative displacement of the combined components, a guide play adjustment or, respectively, a guide adjustment without any play. For example, guide tracks which are longitudinally separate and provided with wedge surface are combined.

Guide track and housing represent another combination. Here, the base of the housing-side guide track groove and the backside of the guide track are in the form of wedge surfaces. Also, a slide wedge provided with a guide groove may be mounted to the carriage so that the slide wedge seam is arranged between the slide wedge with the guide groove and the carriage.

By the adjustment, that is a relative displacement of some guide components which affect the play, the guide structures may be easily set with a play of 2 to 10 micrometers. The adjustment capability may also be used for a service-based play adjustment.

Depending on the gripping task, guide tracks may be used which for example can support weight or which have a wear resistant or low-friction surface. Depending on the material selection, these properties may also be combined.

In the exemplary embodiment, the carriages are supported one after the other in a single guide track.

The carriages are moved by a drive such as a double slide wedge drive which is actuated for example by a pneumatic or hydraulic cylinder-piston unit. Herein, the direction of the linear movement of the piston rod may be redirected by means of a double slide wedge or two slide wedges for example by 90 angular degrees.

Instead of the double slide wedge drive also curve, lever, wheel or puller drives may be used. Also, drive combinations may be used. Furthermore, the number of gripper jaws or carriages is not limited to two.

In the exemplary embodiments, only parts of parallel gripper jaws are shown. Of course, most parts, with the exception of the housing, may also be used for three-, four and multiple jaws, multiple carriages, or center gripping devices, so that the solution can also be applied to such arrangements. With three-, four-, and multiple jaws, in the guide grooves which may be arranged for example star-like or in parallel, per groove generally two carriage guide tracks are provided of a material which can support a greater load than the base body. But per guide groove only one, three or several individual carriage guide tracks may be installed.

The invention will become more readily apparent from the following description of schematically represented embodiments in connection with the accompanying drawings.

BRIEF DESCRIPTION OF THE DRAWINGS

It is shown in:

FIG. 3: A perspective view of the base body of the parallel gripping device of FIG. 1, FIG. 4: A perspective view of the lower lid with a flat gasket disposed thereon.

FIG. 5: A perspective bottom view of the piston without a piston seal,

FIG. 6: A cross-section through the center of the parallel gripping device,

FIG. 7: A cross-section through the parallel gripping device in the area of the vertical mounting bores, FIG. 8: A longitudinal cross-section through a gripping device with two wedge-shaped guide track parts taken along the horizontal guide center plane, FIG. 9: A guide track part according to FIG. 8, FIG. 10: A cross-section enlarged through a carriage at right with insertable guide groove and guide track and at the left, with a longitudinally divided guide track, enlarged, FIG. 11: A perspective front view of a depth-adjustable guide track, FIG. 12: A perspective rear view of a depth-adjustable guide track.

DETAILED DESCRIPTION OF PARTICULAR EMBODIMENTS

Figures 1, 2:
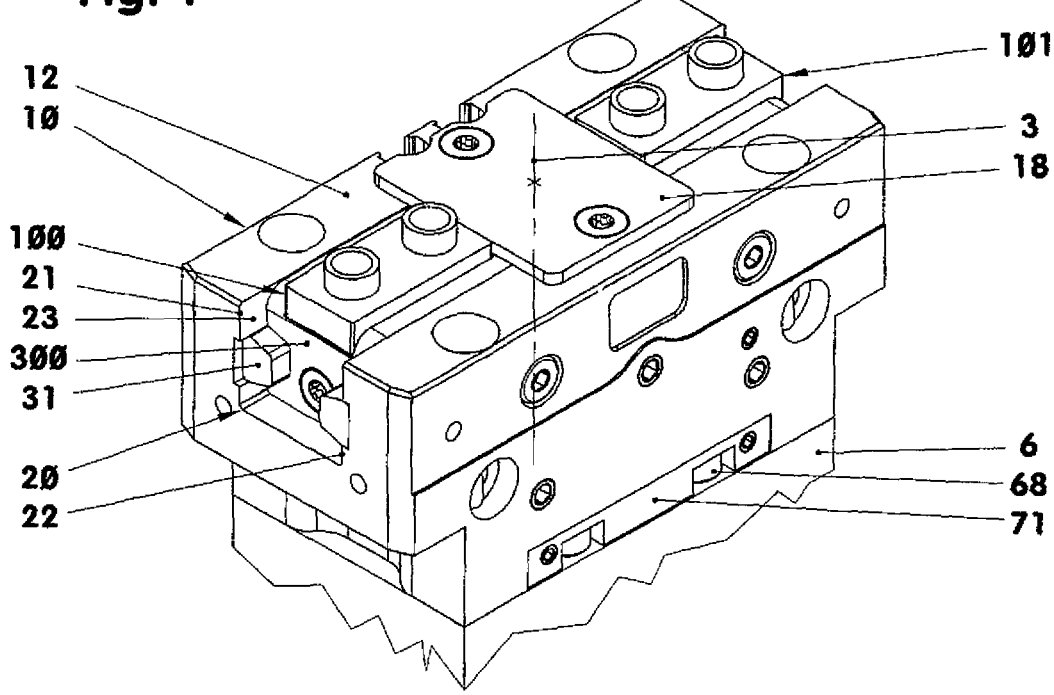
FIG. 1: A perspective view of a parallel gripping device.
FIG. 2: A longitudinal section through the parallel gripping device of FIG. 1 additionally showing gripper jaws. The right gripping device is open.

FIG. 1 shows a parallel-jaw gripping device with two gripping jaws 1, 2 (FIG. 2) disposed on carriages 100, 101. The carriages 100, 101 are longitudinally movably supported by a guide groove 20 disposed in a housing or, respectively, a base body 10 so as to be slidable therein. The housing 10 which includes the guide groove 20 includes furthermore a for example double-acting cylinder-piston unit which acts via a double slide wedge drive 80 (FIG. 2) on the carriages 100, 101. In FIG. 1, the parallel-jaw gripping device is shown mounted above the base body 10 thereof on a machine part or handling device 6. Several parts of the gripping device are adjustable to obtain a highly accurate carriage guide structure or they are assembled from parts which are presorted with precise measurement tolerances.

FIG. 2 shows a parallel jaw gripper device in a longitudinal cross-sectional view with two gripping jaws 1, 2, which are screwed onto the carriage. The gripping jaws engage for example a cylindrical workpiece 7. The gripping jaw 1 of the left device side abuts the workpiece 7 whereas the gripping jaw 2 of the right device side is shown in an open position. Contrary to the representation in FIG. 2, the gripping jaws 1, are synchronized so that they are forced by the drive arrangement to move always either toward each other or away from each other.

The for example parallelepiped block-shaped base body 10 of the parallel gripping device comprises an upper guide section 11 and a lower drive section 51. The base body is manufactured for example from the aluminum alloy AlMgSi1. The length of the base body 10 is for example almost twice its width and its height. In the exemplary embodiment, the base body 10 is 50 mm long. With this design size, the maximum travel distance of each carriage 100, 101 or respectively of the gripping jaws 1, 2 is for example 2.625 mm.

The guide section 11 includes centrally the guide groove 20 which is open at the top-toward the gripping jaws 1, 2, see FIG. 3. The guide groove 20 has a rectangular cross-section with a width of 10.7 mm and a height of 9.3 mm. The planar side walls 23, 24 of the guide groove 20 include each a flat track guide groove 26, 261 with a depth of for example 0.65 mm and a width of 4 mm for accommodating a guide track 31, 32. Each individual track guide groove 26 has a rectangular cross-section, a planar groove base 211 and for example planar side walls. The track guide grooves 26 extend over the full length of the base body 10. In the middle between the planar side walls 23, 24 of the track guide groove 20, there is the vertical longitudinal guide track center plane 29, see FIG. 7. The guide grooves formed into the side walls are in some exemplary embodiments, for example FIGS. 8-12, excluded from a mirror reversal arrangement with regard to a longitudinal guide groove center plane 19. The horizontal longitudinal guide groove center plane 19 extends normal to the guide track center plane 19. It extends in the center of the track guide grooves 26.

Each guide track 31, 32 is essentially a trapezoidal rod which consists of a non-rusting steel for example X90CrMoV18. In the exemplary embodiment, the width of the guide track 31, 32 which extends for example over the length of the base body 10 is 4 mm. The height of the guide track 31, 32 is 75% of its width. Because of the high strength of such a guide track 31, 32, the carriages can transfer relatively large forces to the base body 10. As a result, the gripping device can apply large forces to the workpiece 7 engaged thereby.

The individual guide track 31, 32 has a hexagonal cross-section and has two mirror-reversed symmetrically opposite support flanks 33, 34 which enclose an angle of 30° to 90°. In the exemplary embodiment, the angle is 30°. The mirror-reversed plane 19 extends through the center of the guide track 31, 32. The support flanks 33, 34 cover at least 75% of the guide track height. The guide track height is measured as extending parallel to the center lines of the dowel pins 42 positioning the guide track 31, 32. Between the support flanks 33, 34 and the vertical longitudinal center plane 8, which is disposed therebetween and extends parallel to the free surface 35, there are edges rounded with a radius of 0.5 mm.

At least one of the guide tracks 31, 32 is provided in the middle thereof with a transverse groove 36 having a width of for example 1.2 mm and a depth of for example 1.4 mm. This transverse groove 36 is provided to form a wear-resistant guide structure for the double slide wedge 81 used in the double slide wedge drive 8. The individual guide tracks 31, 32 may also include two or several sections which are arranged one after the other.

In the exemplary embodiment, the guide tracks 31, 32 are each mounted to the base body 10 by two countersunk screws 41, see FIGS. 1 and 3. First, the guide tracks 31, 32 are positioned on the base body 10 with the aid of two dowel pins 42. The dowel pins 42 are arranged each in the area between the screw connections and the nearest base body front side 14. The bores 39 for the dowel pins 42 and the threaded bores 38 are arranged on the horizontal longitudinal center plane of the guide tracks 31, 32.

As shown in FIG. 8, a track guide groove with three groove base sections 212, 213, 214 is machined into the right groove side 22. A center groove section 214 with a length of for example 6 mm is arranged for example mirror-symmetrically with respect to the groove base of the opposite track guide groove. At the left thereof, a groove base section 212 follows which is inclined with respect to the section 214 outwardly at an angle of for example 0.573 angular degrees. As a result, the distance of the groove bases from the left front side of the base body 10 becomes wider. The groove base section 213 is the mirror image to the groove base section 212. As mirror plane in this case serves the vertical center transverse plane 49 disposed between the front sides of the base body 10.

In front of each groove base section 212, 213, there is a guide track part (FIG. 9) arranged so as to abut the base body. Both guide track parts 231, 232 have a trapezoidal cross-section. The front surfaces—in each case the outer one includes a threaded bore 45—are arranged for example in parallel relationship. They extend furthermore at a right angle with respect to the top side 235, 236 of the guide track parts 231, 232. Both top sides 235, 236 are disposed on parallel planes which may be of the same size and shape. The individual guide track part 231, 232 is for example shorter by 3 mm than half the base body length. The groove base section 212, 213 and the associated bottom sides 233, 234 of the guide track sections 231, 232 form the contact junctions 298, 299.

Each guide track part 231, 232 has for example two threaded bores 237, 238 of which the latter is a dead-end bore for the protection of the sealing members 301, 302 from wear. Further, the top side 235, 236 is provided in the areas of the outer front side with a 5° fase 239 in order to avoid damage to the respective sealing members 301, 302 by the respective carriage passing by.

In order to facilitate displacement of the guide track part 231, 232 with respect to the base body 10 during a play adjustment, each guide track part 231, 232 is supported by screws 240 which are screwed into the threaded bores 237, 238 and extend through corresponding oblong holes 221. Displacement is achieved for example using a tool whose tip is provided with an outer thread which is threaded provisionally into the front end bore 45 of the respective guide track part 231, 232.

Before the screws 240 are tightened the respective guide track part 231, 232 is displaced longitudinally so as to accurately adjust the play. With the contact groove inclination as given in the example, a displacement of the guide track part by one millimeter results in a play adjustment of 7.5 micrometer.

Alternatively to the inclination of the groove base section 212, 213 shown in FIG. 8, they can be so arranged that the groove base distance becomes smaller toward the front end of the base body 10. The two grooves base section 212, 213 may also have the same inclination so that their surface normal extend parallel to one another.

In a further embodiment, the adjustable guide track 31 and/or 32 has a length which is for example 6 mm less than the overall length of the base body 10. In this case, with a parallel gripper, both carriages 100, 101 are guided at the same time. Their mounting and adjustment system is an elongated arrangement of the short guide track parts 231, 232.

Of course, the contact junctions 297-299 may be disposed directly on the side walls 23, 24 between guide tracks or respectively, guide track parts—with omission of the track guide grooves 26, 261.

FIG. 10 shows a carriage 100, 101 in a cross-sectional view. As shown, the carriage 100, 101 has at its right side a square recess 112, in which a guide track support is accommodated. The guide track support 113 is provided at its outer side with a carriage guide groove 103 and is rigidly mounted to the carriage 100, 101 by a screw 114. The oblong hole-shaped cutout for the head of the screw 114 is disposed in the groove bottom of the left carriage guide groove 105. In the assembled state, the carriage 100 and the guide track support 113 have for example the same outer contour as the carriage 100 of FIG. 7—with the exception of the play adjustment-dependent width.

Between the carriage 100 and the guide track support 113, there is the contact interface 294 in which the inclined wall of the recess 112 and the inclined wall of the guide track support 113 meet. The contact interface extends at an angle of 0.3 to 1.3 degrees with respect to the vertical longitudinal center guide plane 29. For changing the distance between the two carriage guide grooves 105, for example, in the 0 to 50 μm range, the guide track support 113 is displaced in the carrier travel direction 9 with respect to the carrier 100. The wall of the recess 112 which extends normal to the inclined contact interface 294 serves as smoothly machined support and adjustment guide surface for the guide track support 113.

FIGS. 11 and 12 show two views of a longitudinally divided guide track 241 including the inclined contact interface 293 required for fine adjustment of the play. The guide track 241 comprises a carrier 242 and a trapezoidal attachment 243. The latter is provided with the trapezoidal profile of the guide track 241.

The bottom side of the wedge-shaped carrier 242 abuts the groove base 211 of the track guide groove 26. As shown in FIG. 12, for example, three stepped oblong openings 244 and two mounting bores 245 are provided in the underside of the carrier 242. The top side of the carrier 242 is a planar wedge surface which extends with respect to the underside of the carrier at an angle of 0.3 to 1.3 degrees. The carrier 242 becomes accordingly narrower in the travel direction 9 of the carriage.

The oblong holes accommodate screws 248 by which the carrier 242 is connected to the wedge-shaped trapezoidal attachment so as to be slidable thereon. The bottom side of the trapezoidal attachment 243 has the same inclination of the top side of the support 242 with which it is in contact.

The mounting bores 245 serve the attachment of the assembled and to a certain height adjusted guide track 241 in the housing 10. By the accommodation of the track guide contour and the depth of the oblong holes 244, the expansion of the guide track 241 transverse to the carriage movement direction (9) and parallel to the plane 29 is enlarged. As a result, the depth of the track guide groove 26 which accommodates the guide track 241 is enlarged.

As shown in FIG. 10, in the left carriage guide groove 103, there is further a longitudinally divided guide track 251 which consists of an upper track part 252 and a lower track part 253. Both track parts 252, 253 are wedge-shaped wherein their wedge surfaces which form a contact interface 295 is inclined with respect to the horizontal track center plane 19 by an angle of 0.3 to 1.3 angular degrees. The wedge surfaces are fased at their edges. The upper wider track part 252 is screwed to the base body 10.

The lower wall of the track part 253 is provided with respect to the guide tracks 31, 32, 241 with a recess 254 of several tenths of a millimeter in order to avoid hitting the lower edge of the carriage guide groove 105 upon a widening in the plane 29 for minimizing the play, see FIG. 10.

In this guide track, the position required for a predetermined accuracy is determined by a measured fitting of the lower track part 253 into a pre-assembled construction group. The pre-assembled construction group consists of the base body 10, the carriage 100 and/or 101 and an already fixed regular guide track 31 or 32. The parts 252, 253 are inserted with the predetermined play into the space remaining between the track 26 and the carriage guide groove 105. Their position relative to each other in the direction of the carriage movement based on the play is recorded and/or marked. After the parts are pulled out of the preassembled construction group, the track parts 252, 253 are joined by laser welding along the outer edges of the contact interface area in accordance with the recorded displacement measurements or the markings. Finally, the now single-part guide track 251 is now re-integrated into the construction group.

It is possible to combine the various guide tracks and guide track parts with their counterparts also with different slide wedge systems to form a gripper guide structure.

The drive section 31 disposed below the guide section 11 accommodates essentially the cylinder-piston unit 120 and the channels and passages carrying the operating medium. In the side areas below the guide section 11, the base body is shortened at both sides by about 12% of the overall length of the base body at a height of 38.4% of the overall height of the base body.

The bottom side 13 of the base body 10 has a deep, in this case, twelve-angular cover recess 65 with a depth of for example 3.5 mm. The cover recess 65 extends from the front to the rear longitudinal side wall of the base body 10. From the cover recess 65, for example, a 7 mm deep cylinder cavity 55 extends into the base body 10 in the direction of the guide groove 20, see FIG. 2. The cylinder cavity 55 here has an oval cross-section and a length of for example 54% of the full length of the base body. The width of the cylinder cavity 55 is for example 53.7% of its length. The two radii of the oval cross-section correspond to half of the width of the cylinder cavity 55. Around the cylinder cavity 55, there is a circumferential seal gasket seat recess 56 with a planar base. The gasket 79 disposed therein is shown in FIG. 4 disposed on the cover 71.

In the area of the gasket seat recess 56, there are four bottom bores 57 of which in each case two intersect a compressed air bore 58. The latter are two bores which extend normal to the base body side walls. In accordance with FIG. 3, one is marked "O" for open and the other is marked "C" for close. The bottom bore 57 which intersects the compressed air bore marked C, intersects another transverse bore 59 which is located above the compressed air bore 58. The transverse bore 59 is tightly closed by a threaded pin. By way of this transverse bore 59, compressed air can be supplied to the cylinder cavity 55 near the bottom thereof.

In the center of the bottom of the cylinder cavity 55, there is a through-bore 61 which connects the cylinder cavity with the guide groove 20. In the middle thereof, the through-bore 61 is provided with a groove for accommodating a piston rod seal ring.

For the attachment of the base body 10 to a machine carriage 6, the base body is provided with four vertical mounting bores 15 and two transverse through bores 16. In FIG. 1, specifically the vertical bores 15 are used for the mounting. With the exception of two diagonally opposite bores all other mounting bores 15, 16 are provided with a recess accommodating the respective mounting screw heads.

The base body 10 has in the center area of the side wall shown in FIG. 3 two sensor recesses 66. Their center lines extend parallel to the center line 3 of the device. Their largely U-shaped cross-sections are narrowed in the area of the side wall by opposite projections which serve as position protection for insertable piston position sensors.

The cover 71 which fits with little play into the twelve corner cover recess, see FIG. 4, has in its center area a two-step depression 73 into which the piston 121 of the pneumatic drive 80 may partially extend when the gripper is in a closed gripping position. Around the depression 73, there are four mounting bores 78, via which the cover 71 is mounted onto the base body 10 by four cylindrical bolts 68, see FIG. 1, with a sealing gasket 79 arranged therebetween. For accommodating the heads of the cylinder bolts 68, the cover 71 has recesses or cut-outs which extend into the area of the longitudinal side walls, see FIGS. 1 and 3.

Specifically in the area of the rear curved side wall of the cover 71, there are for example four dead end bores 76 which extend toward the base body 10 and of which two extend up to the elastic seal gasket 79, see FIG. 4. Two dead end bores 75 extend into a long transverse bore 77 which is closed at the longitudinal side walls of the cover 71 by threaded pins. The dead end bores which as shown in FIG. 4 are provided within the circumference of the seal gasket, serve during a gripper release process as outlet bores for the compressed air. The compressed air is supplied via the bore 58 marked "O" into the base body 10 so as to reach from there via the vertical bottom bore 57 through the seal gasket 79 the transverse bore 77.

In the cylinder chamber 4, which is surrounded by the cylinder cavity and the cover 71, an oval piston 121 with a two-part piston rod 131, 132 is disposed. The piston 121 whose average wall thickness is in the exemplary embodiment less than one sixth of the base body height has at its center a three-step through-bore 135 wherein the middle step has the smallest diameter of for example 3.2 mm.

The piston rod end bore step has a diameter of 5 mm for accommodating a piston rod sleeve 131. Around the through-bore 135, the piston 121 has a disc-like projection 124 which serves as upper stop for the piston 121. Its cylindrical circumferential edge may also serve as an inner guide structure for a compression spring.

The oval piston 121 has a quad seal ring disposed in a seal groove extending around the piston forming a swell seal with respect to cylindrical cavity wall of the base body 10. In the area of the seal groove, the piston 121 has at least one pressure compensating bore 127 whose centerline extends for example parallel to the center line 3 and intersects the piston 121 in the area of the seal groove. Via the at least one pressure compensation bore 127 whose diameter is for example 0.7 mm the compressed air reaches during a compressed air supply rapidly the swell seal so that the compressed air presses onto the swell seal ring in order to press the seal ring securely and rapidly onto the groove flank facing away from the compressed air pressure side.

The piston bottom side 122 also includes a projection 125 with a central recess 128 in which the head of the piston rod screw 132 is accommodated. The piston 121 has in the front area thereof two dead end bores 126 into which, when needed, disc magnets 136 are cemented for monitoring the piston position.

The piston rod 131, 132 consists of a piston rod screw 132, for example, a countersunk screw and a piston rod sleeve 131 disposed thereon. These two parts, together with the piston 121 and the double slide wedge 81 of the double slide wedge drive 80 are a form-rigid construction component when the piston rod screw 132 is inserted into a center countersink bore 95 of the double slide wedge 81 and screwed into the threaded bore 96 of the adjacent countersink bore.

The double slide wedge 81, which is arranged in the guide groove 20 as part of a double slide wedge drive 80, is essentially a rod-like component with square cross-section. In the middle thereof, it is provided at opposite sides with vertically sidewardly projecting support webs 85, 86, see FIGS. 13 and 14. The support web 85, 86, which extends parallel to the centerline 3 over the whole double side wedge height, is 1.2 mm wide. It projects from the square rod base form by 1.8 mm.

The double slide wedge 81 is provided at its front ends in each case with a slide wedge angle inclined front surface 83, 84. The slide wedge angle is between 20 and 50 angular degrees with respect to the gripping direction 9. In the exemplary embodiment, the angle is 50°.

Between a front end surface 83, 84 and a support web 85, 86, there is in each case a wedge groove 87 which extends parallel to the inclined front end surfaces 83, 84 over the longitudinal side of the double slide wedge 81. The respective wedge groove 87 is oriented parallel to the nearest front end surface 83, 84. It has a rectangular cross-section. The double slide wedge 81 has accordingly two wedge grooves 87 on each longitudinal side. Since its design is symmetrical with respect to the vertical longitudinal center plane 8, there is for each wedge groove 87 of a longitudinal side a second oppositely disposed wedge groove. In this way, each front end area of the double slide wedge 81 forms—viewed in the cross-section—an inclined T-shaped wedge web 91, 92.

Each wedge web 91, 92 of the double slide wedge 81 engages in a form-fitting manner a guide carriage 100, 101 supported in the guide groove 20. Each of the carriages is primarily a square body which is provided at opposite sides with carriage guide grooves 105. With these grooves 105, the individual carriage 100, 101 is slideably supported on the guide tracks 31, 32. The carriages 100, 101 consist of the steel 16 MnCr$_5$. Other materials such as steel alloys or rust-free and acid-resistant steel may be used for the manufacture of the carriages.

Each individual carriage 100, 101 has a width which is for example 0.2 mm less than the width of the guide groove 20, and has in the front surface 103 facing the double slide wedge 81 an inclined T-groove 106 by means which the carriage 100, 101 extends around the wedge web 91, 92 of the double slide wedge 81 with a play which is smaller than 0.1 mm. In accordance with FIGS. 13 and 14, the base of the T-groove 106 is provided with lubrication pockets 109 which can be filled with lubricants. On the front surface remote from the double slide wedge 81, the individual carriage 100, 101 is provided with a threaded bore 115 whose center line is disposed on the longitudinal center plane 8. Via this threaded bore 115, the guide groove seal 300 can be fixed.

On the top side of each carriage 100, 101, there is for example a rectangularly-shaped adapter 110 with a height of for example 2.5 mm which, with the carriage 100, 101 installed, extends out of the guide groove 20 over the housing top side 12 by for example 1.2 mm. The adapter 110 projects over the outer front side at the end remote from the T-groove 106 by for example 1.5 mm. The planar top side 102 of the adapter 110 is provided with two threaded cylindrical openings on which the gripping jaws 1, 2 are releasably mounted. In the cylindrical openings centering sleeves are disposed for a precise, form-locking positioning of the gripping jaws 1, 2 on the carriages 100, 101. The two gripping jaws 1, 2 may also be formed directly with the adapter 110 or they may fixedly connected thereto.

The carriages 100, 101 are arranged in the guide groove 20—see FIG. 2—one after another in such a way that, with a minimal gripping jaw spacing, their front surfaces 103 are in contact with each other or they are almost in contact.

The center area of the groove opening of the guide groove 20 is closed by for example a rectangular cover plate 18. The cover plate 18 is so wide, that, in the closed position of the gripping jaws 1, 2, the two carriages 100, 101 are almost in contact with the cover plate 18.

Figure 13:
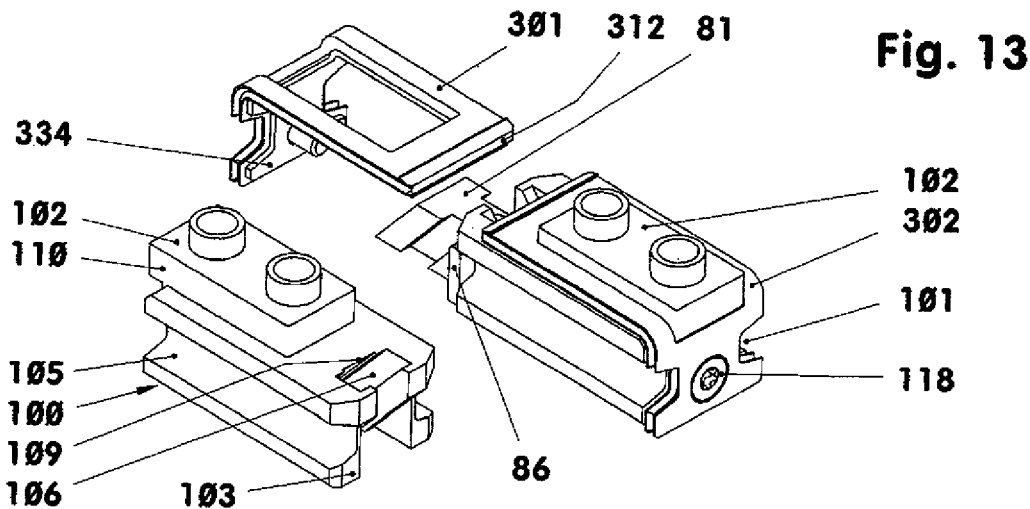
FIG. 13: A perspective view of the carriages, the guide seals and the double wedge from top.
Figure 14:
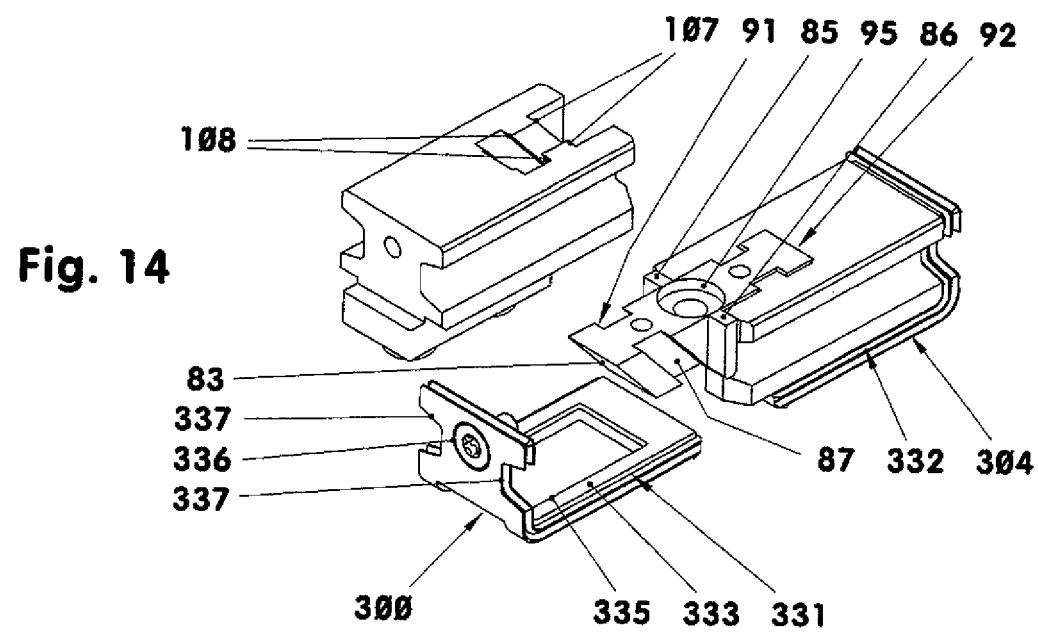
FIG. 14: A perspective bottom view of the carriages, the guide seals and the double wedge.

In order to protect the housing interior 5 and the guide tracks 31, 32 from dirt or other wear-causing contaminations in accordance with FIGS. 13 and 14 angled guide groove seals 300 are placed onto the carriages 100, 101 and are screwed thereon. In the exemplary embodiment, each individual guide groove seal 300 extends around the adapter 110 of the respective carriage 100, 101.

The individual guide groove seal 300 consists essentially of two parts per carriage 100, 101: the seal carrier 331, 332 and the seating member 301, 302. The seal carrier 331, 332 is an angled sheet metal piece of rust-free steel which has a long leg 333 and a short leg 334. The sheet metal piece angle is narrower than the width of the groove of the guide groove 20 to be sealed.

The long leg 333 has a rectangular positioning cut-out 335 into which, in the mounted state, the gripping jaw mounting base of the respective carriage 100, 101 extends. The short leg 334 is provided about in the center thereof with a mounting bore 336 and in each side with a recess 337. The mounting bore 336 serves to accommodate the screw 118 by which the guide groove seal 300 is retained on the carriage. Each recess 337 surrounds a guide track 31, 32 with some play.

On each seal carrier 331, 332, a sealing member 301, 302 is attached so that it slightly extends all around beyond the seal carrier. The elastic seal member 301, 302 seals the housing interior 5 within the guide groove 20 along the base body top side 12 and along the base body front side 14 with respect to the ambient.

Figure 15:
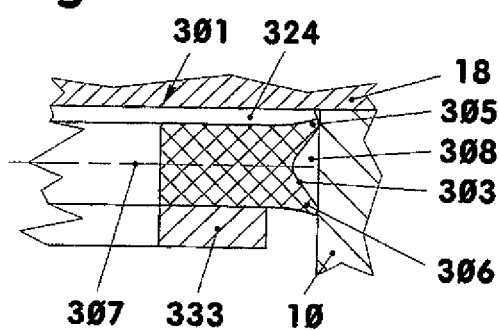
FIG. 15: A partial enlarged cross-section through the guide groove seal in a direction transverse to the guide groove.

The individual sealing member 301, 302 abuts the guide groove walls 23-25 with a double lip profile 303. The lip profile 303 has an upper outer seal lip 305, which serves as a first barrier against ambient dirt in the form of dust and/or moisture. As a result of the material-internal flex force the lip 305 is pressed after installation slightly upwardly. A lip 306 which, with respect to size and geometric dimensions, is comparable is inclined toward the housing interior 5. Its purpose is to retain the lubricant of the double slide wedge drive 80 within the housing interior 5. The lip 306 is at least almost symmetrical to the upper outer lip 305. The axis 307 shown in FIG. 15 serves as symmetry line.

The two sealing lips 305, 306 enclose a channel-like space 308 which has a depth of for example at least 0.25 mm and which ends at the inner front side 312 with a V-shaped opening 309. Along the inner front side 312, the outside 311 of the sealing members 301, 302 is provided with a third seal lip 324 which, upon movement of the carriages 100, 101 slides along the bottom side of the housing cover plate 18.

Figure 16:
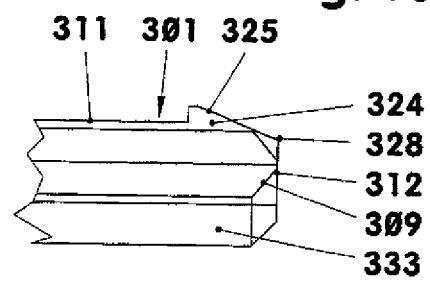
FIG. 16: A partial cross-section through the guide groove seal parallel to the direction of the guide groove, enlarged.

The seal lip 324 (see FIG. 16) has the shape of a wedge whose front edge 328 points in the direction of the base body center line 3.

The seal body 301, 302 consist of a rubber material which, in the exemplary embodiment, is vulcanized onto the seal carrier. But it may also be in the form of a separate part which, at the end, is cemented onto the seal carrier 331, 332.

During the release and/or the gripping stroke the seal members 301, 302 move together with the seal carriers 331, 332 and the carriages 100, 101 back and forth within the guide groove 20. During the gripping stroke, the inner seal lip 306 acts as a wiper for the lubricant. During the release stroke, the other seal lip 305 is to wipe and clean the guide track 31, 32 and the guide groove 20.

For the closing and gripping movement, see FIG. 2, the piston 121, together with the double slide wedge 81, is moved by compressed air from its upper end position downwardly. To this end, compressed air is supplied to the piston rod side of the cylinder. The downwardly moving double slide wedge 81 pulls the carriages 100, 101 in the guide groove 20 inwardly toward the center. The combination of piston 121, piston rod 131, 132 and double slide wedge 81 is additionally guided in the transverse grooves 36 of the guide tracks 31, 32. To this end, the support webs 85, 86 abut the side flanks of the transverse grooves 36 with play of less than 0.05 mm. The front surfaces of the support webs 85, 86 are in contact with the respective groove bottom surface of the transverse grooves 36.

During the closing movement, the wedge surfaces (108) abut the double slide wedge 81. As soon as the gripping jaws 1, 2 abut the workpiece their movement stops while the full clamping force is maintained.

For releasing the workpiece 7 compressed air is supplied to the bottom side of the piston. The now upwardly moving piston 121—double slide wedge 81 combination presses the carriages 100, 101 or, respectively, the gripping jaws 1, 2 is apart until the piston rod end side 123 abuts base wall 55 of the cylinder cavity. During the release movement, the wedge surfaces are in contact with the double slide wedge 81.

For increasing the clamping and release force several pistons may for example be arranged in the cylinder in series. The piston force may also be enhanced by a mechanical spring in one stroke direction.

| Reference numerals: | |
|---|---|
| 1, 2 | Gripping jaws |
| 3 | Center line |
| 4 | Cylinder chamber |
| 5 | Housing interior |
| 6 | Machine part, handling device |
| 7 | Workpiece |
| 8 | Vertical longitudinal center plane |
| 9 | Carrier gripping and travel direction |
| 10 | Base body, housing |
| 11 | Guide section |
| 12 | Base body or housing top side |
| 13 | Base body bottom side |
| 14 | Base body front side |
| 15 | Vertical bore |
| 16 | Transverse bore |
| 17 | Threaded bore |
| 18 | Cover plate |
| 19 | Horizontal guide track center plane |
| 20 | Guide groove |
| 21 | Left groove side |
| 22 | Right groove side |
| 23, 24 | Sidewalls |
| 25 | Guide groove walls |
| 26, 261 | Track guide grooves |
| 27 | Dead end bore |
| 28 | Dowe pin bore |
| 29 | Vertical longitudinal guide groove center plane |
| 31 | Guide track |
| 33, 34 | Support flanks |
| 35 | Area between 33 and 34 |
| 36 | Transverse groove |
| 37 | Bottom surface |
| 38 | Threaded bores |
| 39 | Dowel pin bores |
| 41 | Countersunk screw |
| 42 | Dowel pin |
| 45 | Threaded bore |
| 49 | Vertical outer transverse plane |
| 51 | Drive section |
| 55 | Cylinder cavity |
| 56 | Gasket seat recess |
| 57 | Bottom bores |
| 58 | Compressed air bore |
| 59 | Transverse bore |
| 61 | Through bore |
| 65 | Cover recess |
| 66 | Sensor recesses |
| 68 | Cylinder bolt |
| 71 | Cover |
| 73 | Depression |
| 75, 76 | Seal gasket |
| 77 | Transverse bores |
| 78 | Mounting bore |
| 79 | Gasket |
| 80 | Double slide wedge drive |
| 81 | Double slide wedge |
| 83, 84 | Inclined front end surfaces |
| 85, 86 | Support web |
| 87 | Wedge groove |
| 91, 92 | T-shaped wedge web |
| 95 | Countersunk bore |
| 96 | Threaded bore |
| 100, 101 | Carriages |
| 102 | Top side |
| 103 | Front surface |
| 105 | Carriage guide groove |
| 106 | T-groove |
| 107 | Wedge surfaces |
| 108 | Wedge surfaces |
| 109 | Lubrication pockets |
| 110 | Adapter |
| 112 | Recess |
| 113 | Guide track support |
| 114 | Screw |
| 115 | Threaded bore |
| 118 | Screws |
| 120 | Cylinder-piston unit, pneumatic |
| 121 | Piston |
| 122 | Piston bottom side |
| 123 | Piston rod side |
| 124 | Projection stop |
| 125 | Projection |
| 126 | Dead end bores |
| 127 | Pressure compensation bore |
| 128 | Recess |
| 131 | Piston rod sleeve |
| 132 | Piston rod screw head |
| 135 | Through-bore |
| 136 | Disc magnets |
| 211 | Groove base |
| 212 | Groove base section |
| 213 | Groove base section |
| 214 | Groove base section |
| 221 | Oblong hole |
| 231 | Guide track part |
| 232 | Guide track part |
| 233 | Bottom surface of 231 |
| 234 | Bottom surface of 232 |
| 235 | Top side of 231 |
| 236 | Top side of 232 |
| 237 | Threaded bore |

| Reference numerals: | |
|---|---|
| 238 | Threaded bore |
| 239 | Fase |
| 240 | Screw |
| 241 | Guide track, contact junction |
| 242 | Carrier |
| 243 | Trapezoidal attachment |
| 244 | Oblong opening |
| 245 | Mounting bore |
| 248 | Screw |
| 251 | Longitudinally divided guide track |
| 252 | Upper track part |
| 253 | Lower track part |
| 254 | Recess |
| 261 | Track guide groove |
| 263 | Guide groove section |
| 264 | Guide groove section |
| 293 | Contact interface |
| 294 | Contact interface |
| 295 | Contact interface |
| 297 | Contact junction parallel |
| 298 | Contact junction inclined |
| 299 | Contact junction inclined |
| 300 | Guide groove seal |
| 301, 302 | Sealing members |
| 303 | Lip profile |
| 304 | Double lip |
| 305 | Upper outer seal lip |
| 306 | Inner seal lip |
| 307 | Axis of symmetry |
| 308 | Channel-like space |
| 309 | Opening |
| 311 | Outer side |
| 312 | Front side |
| 324 | Seal lip |
| 325 | Sealing flank |
| 328 | Front edge |
| 331, 332 | Seal carrier |
| 333 | Long leg |
| 334 | Short leg |
| 335 | Positioning cutout |
| 336 | Mounting bore |
| 337 | Recesses |

What is claimed is:

1. A gripping device with carriages (100, 101) carrying movable gripping elements (1,2) wherein the carriages (100, 101) are arranged in a gripping direction (9) one after an other in a common guide groove (20) which is formed in a base body (10) and is at least partially open toward the gripping elements (1, 2) and the carriages are firmly supported in a direction parallel to the gripping direction (9) and operable between on opening and a closing position, wherein the open guide groove (20) has two oppositely arranged guide groove walls (23, 24) which are oriented mirror-like with respect to a vertical longitudinal center guide plane (29), wherein in each guide groove wall (23, 24) a track guide groove (26, 261) is arranged, wherein in each track guide groove (26, 261) at least one carriage guide track (31, 32) is mounted, wherein at least one track guide groove (26, 261) and at least one carriage guide track (31, 32) mounted in the at least one track guide groove has, for each carriage (100, 101) or each carriage pair disposed in the at least one track guide groove, a surface in contact with one another along a contact junction (297, 298, 299), which is inclined with respect to the carriage movement direction at an angle of 0.3 to 1.3 angular degrees, and wherein the cross-sectional area of the carriage guide track (31, 32) which projects from the track guide groove (26, 261) has a trapezoidal shape.

2. The gripping device according to claim 1, wherein the guide groove (20) includes on a first groove side (21) at least one track guide groove (26) with a groove base (211) which extends parallel to the vertical longitudinal center plane (29).

3. The gripping device according to claim 2, wherein the guide groove (20) includes on a second groove side (22) at least one track guide groove (261) with a groove base which is divided into at least two sections (212, 213, 214), of which two sections (212, 213) extend with respect to the vertical longitudinal center plane (29) and the carriage travel direction (9) each at an angle of 0.3 to 1.3 angular degrees and each of the sections (212, 213) supports a partial guide track (231, 232).

4. The gripping device according to claim 3, wherein the groove base sections (212, 213) extend at an angle which is in a range of 181.6±1 angular degrees or in a range of 178.4±1 angular degrees.

5. The gripping device according to claim 3, wherein the groove base sections (212, 213) extend with respect to the vertical longitudinal center plane (29) at an angle of 0.3 to 1.3 angular degrees and at the same time or oriented parallel to each other.

6. The gripping device according to claim 3, wherein the carriage guide tracks (31, 32, 251) or the partial guide tracks (231, 232) are provided in each case on at least one front side with a threaded bore (45) or an adapter connection.

7. A method for increasing the guide accuracy of carriages (100, 101) carrying gripping elements (1,2) of a gripping device, wherein the carriages (100, 101) are arranged in gripping direction of the gripping elements (1, 2), one after the other, in a commonly used guide groove (20) which is provided in a base body (10) and which his at least partially open toward the gripping elements (1, 2) and the carriages (100, 101) are movable parallel to the gripping direction (9) between an opening and closing position and are supported from all sides transverse to the gripping direction (9), wherein, in the carriage guide grooves (25, 26) or the guide groove sections (263, 264) of the base body (10), carriage guide tracks (31, 32) or partial guide tracks (231, 232) are arranged which have, in the area of the respective cross-section of the individual carriage guide track (31, 32) or the individual partial guide tracks (231, 232) which projects from the track guide groove (26, 261) or the respective guide groove section (263, 264), each a trapezoidal form, the method comprising the steps of:

with the track guide grooves (26, 261) ox guide groove sections (263, 264) and carriage guide tracks (31, 32) or partial guide tracks (231, 232) with contact junctions (298, 299) which are inclined with respect to the vertical longitudinal center guide plane (29), adjusting the guide play of the carriages (100, 101) using an adjustment tool by displacing the carriage guide tracks (31, 32) or the partial guide tracks (231, 232) in the movement direction of the carriages by up to 3 mm, or with track guide grooves (26, 27) which extend parallel with respect to the vertical longitudinal center guide plane (23), first measuring the distance between the groove bottoms (211) of the opposite track guide grooves (26), second, measuring the depth of the carriage guide grooves (105) of the carriages (100, 101) third, recording the contour of the support flanks (33, 34) and the base surface (37) of the carriage tracks (31, 32) and fourth, combining the components mentioned under first, second and third (10, 100, 101, 31, 32, 231, 232) based on their geometric measurement values with a predetermined guide play so as to form a carriage guide system of high accuracy.

8. The method according to claim 7, wherein the position of the support flanks (33, 31) of the carriage guide tracks (31, 32) with respect to the base surface (37) is determined by measuring the distance of the location of the average width of the trapezoidal cross-section part with respect to the base surface (26, 261) of the guide tracks (31, 32).

\* \* \* \* \*